United States Patent [19]

Browne

[11] 4,287,682
[45] Sep. 8, 1981

[54] PLANTER

[76] Inventor: Christopher R. Browne, 67-3120 Sheppard Ave. East, Agincourt, Ontario, Canada, M1T 3J9

[21] Appl. No.: 127,957

[22] Filed: Mar. 7, 1980

[51] Int. Cl.³ .............................................. A01G 27/00
[52] U.S. Cl. ........................................... 47/81; 47/72
[58] Field of Search .................... 47/81, 80, 74, 66, 39, 47/73, 72

[56] References Cited

U.S. PATENT DOCUMENTS

| | | | |
|---|---|---|---|
| 1,281,390 | 10/1918 | Kelling | 47/81 X |
| 1,342,786 | 6/1920 | White | 47/81 |
| 3,298,133 | 1/1967 | Courtright | 47/81 X |
| 3,576,088 | 4/1971 | Arca | 47/81 |
| 3,778,928 | 12/1973 | Green | 47/80 |
| 3,849,932 | 11/1974 | Adams | 47/73 |
| 3,962,823 | 6/1976 | Zipperer | 47/73 |

FOREIGN PATENT DOCUMENTS

| | | | |
|---|---|---|---|
| 183168 | 1/1906 | Fed. Rep. of Germany | 47/81 |
| 2358982 | 6/1975 | Fed. Rep. of Germany | 47/80 |
| 1452871 | 8/1966 | France | 47/81 |
| 109632 | 8/1966 | Norway | 47/81 |
| 466630 | 1/1969 | Switzerland | 47/81 |
| 927792 | 6/1963 | United Kingdom | 47/74 |
| 1069571 | 5/1967 | United Kingdom | 47/81 |
| 2018117 | 10/1979 | United Kingdom | 47/81 |

Primary Examiner—Steven A. Bratlie
Attorney, Agent, or Firm—Cullen, Sloman, Cantor, Grauer, Scott & Rutherford

[57] ABSTRACT

A planter formed of an open top box having a platform supported within and above the bottom of the box. A generally flat, horizontally arranged bag, containing a plant growing filler material rests upon the platform and substantially covers the open top of the box so that the box provides a liquid reservoir beneath the platform. A capillary type wick sheet arranged upon the platform and having a portion extending downwardly into the reservoir flows water, through capillary action, to the filler which may be exposed to the sheets through openings formed in the bag. A frame extends around the bag and is supported upon the box to extend the height of the box for appearance purposes, as well as to protect and contain the edges of the bag. Plants may be grown in the filler material through appropriate openings formed in the upper surface of the bag.

5 Claims, 5 Drawing Figures

PLANTER

BACKGROUND OF INVENTION

Planter boxes are commonly used for growing various types of plants in locations which do not otherwise have soil of suitable quality or quantity. Typically, these planters are used to grow plants in or around buildings, as for example, in living or working areas in buildings, or on balconies, roof tops, decks or the like. Planter boxes are also used in small, home-type greenhouses or similar structures designed for growing plants. Conventional planter boxes ordinarily comprise an open top box-like container within which a quantity of plant growing material is placed. The plant growing material commonly is formed of ordinary dirt, with fertilizer mixes, or peat-moss or the like.

Frequently, after the plants have matured, and replanting is desired, the soil material is no longer of sufficient quality to permit reuse. For example, it may contain roots, and other debris, insects and plant disease microorganisms, and may have its natural or added fertilizer content depleted, etc. Thus, it may be desirable, for these and other reasons, to replace the plant growing filler material from time to time, particularly at each new planting. This presents a messy disposal problem where these planters are used within homes or in other locations where it is not convenient to simply overturn the planter to dump out the contents. Moreover, it may be difficult to handle or move an entire planter box and its contents to a suitable location for dumping.

Conventional planter boxes must be regularly watered, as required, in order to promote the plant growth and preserve the plants. However, the watering requirement is frequently overlooked by the planter owners, particularly at times when they may be away from the premises within which the planter is located. Frequently, plants are given either too much water or too little water. In addition, because of evaporation losses or rapid plant root water absorption, planters tend to be too dry between regular waterings, which adversely affects the plant growth. Thus, it would be desirable to have a more automatic or regular plant watering system available.

In the case of commercial greenhouses, various types of watering systems have been provided. One type includes the use of wicking materials for providing water through capillary action from a reservoir to the bottoms of flower pots or similar types of plant containers. Although this kind of wicking material has been used in commercial plant growing operations, such as in greenhouses, it has not previously been practical for conventional types of planters.

Consequently, the invention herein relates to an improved planter construction which simplifies the watering of plants and the handling of the plant growing filler materials.

SUMMARY OF INVENTION

The invention herein contemplates forming a planter having an open top planter box, with a platform arranged near the upper, open end of the box in order to provide a liquid reservoir beneath the platform. The required soil type filler material is packaged within a large bag, which is relatively flattened and is arranged to substantially completely cover the open top of the planter box and rest upon the platform. Water is supplied to the filler material by means of a capillary type wick sheet which is arranged upon the platform, beneath the bag, with a portion extending into the liquid filling the box so that, through capillary action, the liquid automatically feeds from the reservoir into the filler material. The bag is provided with appropriate openings or passageways which permit physical contact between the filler material and wick sheet so the liquid may pass into and be absorbed by the filler.

Slits formed in the upper surface of the bag provides access openings through which seeds or small plants may be planted and through which the plants may grow. The bag itself is protected and confined by means of a frame which surrounds the bag and is supported upon the planter box.

The platform may be formed as a bottom section or portion of the frame, with openings between the platform and the frame walls through which portions of the wick sheet may pass. The platform, with the attached frame, is thus supported within the planter box.

In order to simplify the construction, the planter box may be formed of a wood or other material which is not necessarily liquid or water impervious. Thus, a plastic bag-like water impervious lining may be inserted within the planter box and this is held in place by means of a stiff sheet of cardboard-like material which extends across the bottom floor of the planter box to hold the liner down, with flaps on the opposite ends of the sheet pressing the sides of the liner against the walls of the box. The same sheet may have bent up peaks formed for providing the support means to hold the platform, with the frame, well above the bottom floor of the box.

Consequently, the invention contemplates being able to fill the box from time to time, with water or a water solution containing fertilizer and other nutrients, and then permitting the capillary action of the wick sheet to automatically feed the water or solution, in the amount needed, to the filler. Because the bag substantially covers the open top of the box, evaporation is limited, although the bag may be moved aside, along its edges, for easily refilling the reservoir forming box.

One object of this invention is to provide a simplified system for handling the plant growth filler. Thus, by utilizing a bag for containing all of the filler, such as a peat-moss or a soil-like mixture, the filler can be handled as a unit for positioning within and removing from the planter for use and for disposal when the filler is to be replaced. The bag may be slit at its upper surface, for receipt of plants, and at its lower surfaces for passage of the water into the filler. This eliminates the usual mess of filling and refilling planter boxes.

Another object of this invention is to provide a filler system which substantially reduces water evaporation from the filler material and from the reservoir which stores the water for transmittal to the filler.

An additional object of this invention is to provide a greater control over the rate and volume of water feed, by means of a wick type feed system, which automatically operates for extended periods of time without attention. Water is continuously supplied from the reservoir at a rate which generally corresponds to the demand of the filler for water to replenish water which is used up by the plants or by the limited amount of evaporation.

Yet another object of this invention is to provide a simplified planter box arrangement which can be easily packaged, stored and shipped with minimum space requirements. The planter may be assembled, without the use of tools or mechanical knowledge or abilities, for immediate use within a home or other confined planting area.

These and other objects and advantages of this invention will become apparent upon reading the following description, of which the attached drawings form a part.

DETAILED DESCRIPTION

Figure 1:
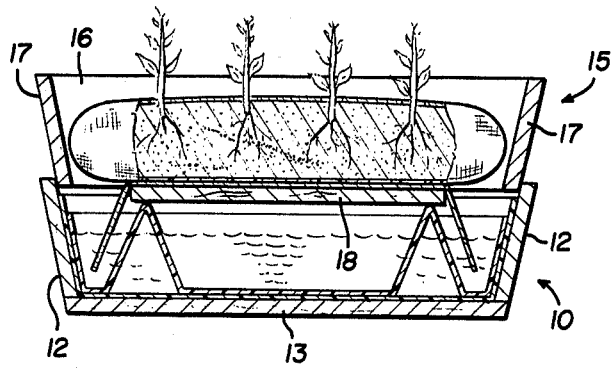
FIG. 1 is a cross sectional elevational view of the planter box herein.

Referring to the drawings, the planter box includes a lower boxlike container 10. This container has side walls 11, end walls 12, and a closed base or floor 13. The container may be made of wood, such as plywood pieces or boards or combinations of these, or other suitable, rigid sheet material. Preferably, the walls are angled, relative to the vertical, to provide a sloping visual effect.

Figure 5:
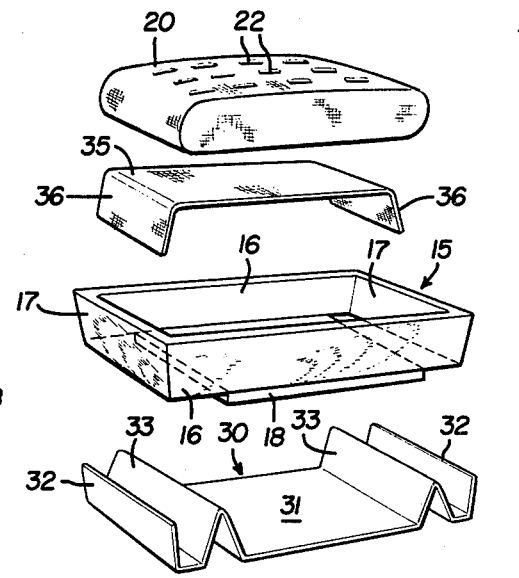
FIG. 5 is a perspective view of the various parts which make up the complete planter unit, showing the parts aligned for assembly.
Figure 4:
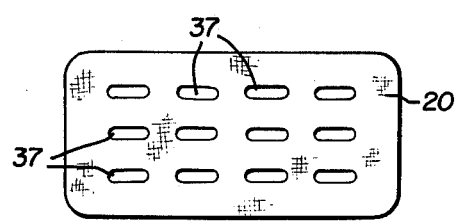
FIG. 4 is a plan view, to a reduced scale, showing the bottom of the plant filler bag.

A frame 15 is arranged at the upper, open top of the container. This frame is likewise formed of side walls 16, end walls 17, and a partial base or floor 18. The walls are sloped, corresponding to the angle of slope of the box-like container. The base 18 forms a platform which is fastened to the bottom of the frame and is spaced away from the end walls (see FIG. 5). Alternatively, the base may be spaced from the side walls.

Figure 2:
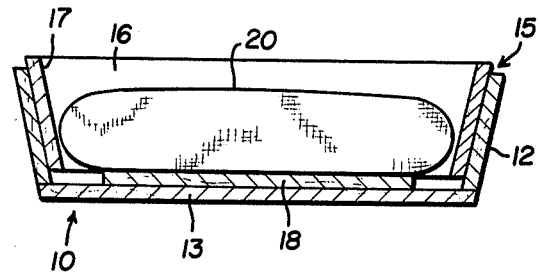
FIG. 2 is a cross sectional elevational view of the planter box shown in nested position, that is, packaged for handling and shipment or storage.
Figure 3:
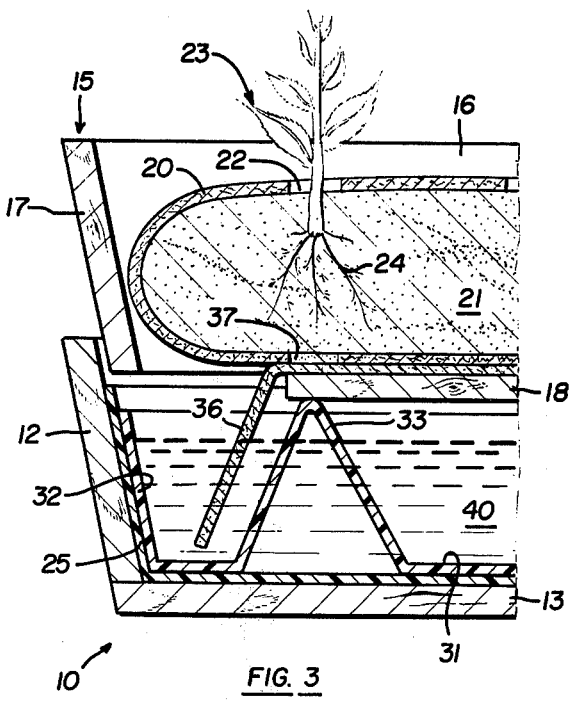
FIG. 3 is an enlarged, cross sectional elevational view of a fragment of the planter box.

Preferably, the frame is made of a size and shape so as to nest within the box, as illustrated in FIG. 2, when the planter is not in use. Thus, the planter may be compacted, by nesting the parts, for storage and shipment and the like. The frame may be made of wood strips, such as boards or of plywood, with the walls preferably formed to match the appearance of the walls of the box so as to give an overall attractive appearance to the planter.

The bag 20 may be formed of a thin gauge, flexible, plastic material, such as sheet polyethylene material or the like. The bag is filled with a plant growth filler material 21, such as peat-moss, soil with or without peat-moss mixed in etc., Fertilizer materials can also be mixed in. The filler material 21 may vary, depending upon the locally available material, costs, and the nature of the plants to be grown within the planter. The bag is relatively flat, when laid horizontally and is of the size and shape to substantially cover the open, upper end of the box-like container 10, and to substantially fill the frame 15.

For growing plants within the bag, a number of slits 22 may be cut in the bag upper surface. Either small plants or seeds may be inserted through the slits. Thus, the plants 23 grow upwardly, through the slits or openings in the bag, while their roots 24 spread out within the filler material 21.

In order to waterproof the box-like container to provide a reservoir for the water or water-fertilizer mixture, a thin plastic inner liner 25 is applied within the container. This liner, may be shaped like an open top bag or tray and it may be made of thin gauge plastic sheet material such as polyethylene.

A relatively stiff, cardboard like sheet 30 is shaped to hold the liner in place within the container and also to form the support means for the platform, tray and bag. Thus, the sheet is formed with a base portion 31 which rests upon the bottom of the liner 25 to hold the liner against the floor or base 13 of the container. Bent up end flaps 32 on the sheet clamp the walls of the liner against the walls of the container.

The sheet is also provided with bent up peaks 33, which are inverted V-shapes. At least two of such peaks are provided. More peaks may be provided, if necessary, to add structural strength. These peaks function as the support means upon which the platform of base 18 of the frame is rested.

The planter box may be made of a water impervious material, such as of plastic. In that case, the liner 25 may be omitted and likewise the end flaps 32 on sheet 30, may be omitted.

A capillary type wicking sheet 35 is laid over the platform 18. The end portions 36 of this sheet extend downwardly into the container through the spaces between the opposite ends of the platform and the adjacent end walls of the frame. Commercially available capillary type wicking sheets may be used. This material functions to feed liquid, through capillary action, along its length. Such commercially available materials typically are formed of felted or nonwoven fabric made of numerous natural or synthetic fibers which are adhered together.

Openings 37, cut into the lower surface of the bag 20, permit the passage of fluid from the wicking sheet into the filler material to provide the moisture needed for plant growth.

Referring to FIG. 2, the various parts are packaged together by nesting the frame within the box-like container. The bag is then positioned within the frame along with the other elements which make up the planter. Thus, the planter may be shipped as a nested package.

When the purchaser takes the planter to his home or building for use, the various parts are separated. Then, the sheet 30, which may be prescored along fold lines, is folded to provide the end flaps and peaks. The liner 25 is inserted within the box-like container and the sheet 30 is positioned so that its base portion 31 holds the liner down and its end flaps hold the ends of the liner in place against the walls of the container.

Next, the frame is place upon the box-like container with its base or platform 18 rested upon the peaks. Then the wicking sheet is laid over the platform and water is poured over it to thoroughly wet or "prime" the sheet. Thereafter, the bag is positioned upon the platform, after forming the openings in the lower surface of the bag for the passage of fluid from the wicking sheets to the filler material.

Slits may be cut in the upper surface of the bag through which the plants or seeds are inserted for growth. Next, the box-like container is filled with liquid 40 which may consist only of water, or of a water-fertilizer mixture or the like. Thus, the container forms a reservoir which may contain sufficient liquid for a long period of time, such as a number of days or weeks. It is also desirable to add water to the filler through the upper surface slits before the plants or seeds are inserted.

The watering of the filler material and the plants is automatically accomplished through the capillary action of the wicking sheet 35. By using an appropriately selected wicking sheet material the rate of flow of water to the filler can be closely approximated to the loss of free water from the filler. To a considerable extent, the filler moisture content controls the rate of water replenishment to provide a demand or a need type of self-watering system.

When it is desired to replace the filler material, the user may simply remove the entire bag and dispose of it. The bag is then replaced with a new bag containing new filler material without any mess.

As can be seen, the construction of the various parts which make up the planter is very simple and inexpensive. Readily available materials are used, such as the wood, plastic sheets, etc. Significantly, the parts are easily handled and assembled by an inexperienced, unskilled person, without the need for any tools. Hence, the planter is immediately usable, when desired, without difficulty or time consuming assembly.

Having fully described an operative embodiment of this invention, I now claim:

1. A planter comprising:

an open top, generally flat, box-like container having a closed bottom and upstanding walls, said container adapted for use as a reservoir for holding liquid, such as water and aqueous solutions of plant fertilizers and nutrients and the like;

a substantially horizontally arranged platform positioned within the container and having support means holding the platform a considerable distance above the bottom of the container, a water impervious plastic bag-liner closely fitted within said container against its bottom and upstanding walls to hold liquid within the container, and said support means comprising a relatively stiff sheet of cardboard-like material having a base portion closely arranged within the container against the plastic bag-like liner to hold the liner against the container bottom and said support means having spaced apart peaks bent up from the base portion for supporting said platform and said support means having bent up end flaps formed on its opposite ends for holding portions of the liner against their adjacent container wall surfaces;

a roughly flat generally horizontally arranged bag of a size to substantially cover the open top of the container, with the bag being pre-filled with a plant growing filler material, such as peat moss, soil compositions and the like;

with said bag being positioned upon and thereby supported by said platform considerably above the bottom of the container while substantially covering the open top of the container, and an upper, box-like frame of approximately the size of said container, said frame supported upon the platform support means and extending a distance above the container for surrounding the sides and ends of said bag;

a capillary type wicking sheet means arranged upon the platform beneath the filler material and having a portion extending beneath the platform into the container for capillary flowing liquid from the container to the filler material; and with the exposed upper surface of the bag being adapted to be perforated for receiving plants, whereby the roots of the plants extend within the filler material and are watered by the capillary flow.

2. A planter as defined in claim 1, and said bag being formed of a thin plastic sheet material and having a number of openings formed in the bag lower surface for transmitting the liquid from the container to the bottom portion of said filler material.

3. A planter as defined in claim 2, and said wicking sheet means substantially covering the bottom surface of the bag and having a portion extending downwardly from the bag into the reservoir forming portion of the container.

4. A planter as defined in claim 1, and said platform being fastened to the bottom of said frame and being spaced from at least one wall of the frame a sufficient distance to permit the wicking sheet means to extend through the space into the reservoir forming portion of the container.

5. A planter as defined in claim 4, and said frame fitting within the walls of the container so that its lower edges are telescoped within the container, wherein the frame and bag may be packaged within the container for storage and shipping.

* * * * *